United States Patent
Cave

[19]

[11] Patent Number: 5,958,014
[45] Date of Patent: Sep. 28, 1999

[54] SYSTEM AND METHOD FOR ESTABLISHING A REAL-TIME AGENT POOL BETWEEN COMPUTER SYSTEMS

[75] Inventor: Ellis K. Cave, Garland, Tex.

[73] Assignee: InterVoice Limited Partnership, Reno, Nev.

[21] Appl. No.: 08/719,162

[22] Filed: Sep. 24, 1996

[51] Int. Cl.⁶ .............................. G06F 13/38; G06F 15/17
[52] U.S. Cl. .......................... 709/229; 709/204; 709/205; 379/93.12
[58] Field of Search ......................... 395/200.32, 200.34, 395/200.37, 200.57, 200.59, 200.69, 200.35; 379/93.09, 93.12; 370/270; 709/204, 205, 229

[56] References Cited

U.S. PATENT DOCUMENTS

| | | | |
|---|---|---|---|
| 4,071,698 | 1/1978 | Barger et al. ................................. | 179/2 |
| 5,327,490 | 7/1994 | Cave ....................................... | 379/216 |
| 5,448,724 | 9/1995 | Hayashi . | |
| 5,563,805 | 10/1996 | Arbuckle et al. ........................ | 364/514 |
| 5,563,937 | 10/1996 | Bruno et al. ............................. | 379/201 |
| 5,604,896 | 2/1997 | Duxbury et al. ......................... | 395/500 |
| 5,619,557 | 4/1997 | Van Berkum .............................. | 379/88 |
| 5,729,687 | 3/1998 | Rothrock et al. ................... | 395/200.35 |
| 5,764,916 | 6/1998 | Busey et al. ....................... | 395/200.34 |
| 5,768,513 | 6/1998 | Kuthyar et al. .................... | 395/200.34 |
| 5,774,663 | 6/1998 | Randle et al. ...................... | 395/200.34 |
| 5,784,561 | 7/1998 | Bruno et al. ....................... | 395/200.34 |

*Primary Examiner*—Mark H. Rinehart
*Attorney, Agent, or Firm*—Fulbright & Jaworski L.L.P.

[57] ABSTRACT

A system and method for establishing a data connection between a computer and a live agent selected from an agent pool. A computer user uses the computer to connect via a network with an information server. While browsing information on the server, the customer can request to speak with an unspecified live agent. An agent queuing manager receives the customer's request and selects an appropriate live agent from a continuously updated pool of available agents. Then, the agent queuing manager establishes a data connection between the live agent and the customer. The data connection is preferably an audio connection, although a real time text "chat" mode is also available. The agent queuing manager maintains the agent pool by monitoring when agents log in and out of agent terminals, as well as when the agents are engaged with a computer user.

39 Claims, 2 Drawing Sheets

SYSTEM AND METHOD FOR ESTABLISHING A REAL-TIME AGENT POOL BETWEEN COMPUTER SYSTEMS

TECHNICAL FIELD OF THE INVENTION

This invention relates to a system and method for achieving bi-directional voice communications between computer systems and more particularly to a system and method for achieving a real-time ACD Agent Pool.

BACKGROUND OF THE INVENTION

The computer (PC) is now being used for all types of applications. When combined with a data network which interconnects diverse computer users, such as the internet, a wide range of sophisticated transactions are possible. For example, a traditional service provided by InterVoice, Inc. ("InterVoice") has been to provide information such as a banking statement over a telephone line to a caller. Now people are beginning to say "I want to use my PC to obtain my last month's statement."

In response, InterVoice and others have started putting the same kind of information in an internet browser format as has traditionally been available in an audio format. For example, a bank customer can use a PC and a web browser to connect with a bank's server and retrieve a menu with choices such as paying bills, checking an account balance, or obtaining a monthly statement. The user can then make a selection and, if desired, have the output printed on a local printer or displayed on a screen.

Note that the computerized transaction involves the same set of information that the user gets if the user calls the bank on the telephone to get the data in an audio format. A difference is that the telephone transaction gives the user the option of pushing "0" and talking to a live customer service agent. Unfortunately, this option of speaking to a live agent does not exist on the internet connection. Thus, when a person is connected to a web page or a similar computer-based information retrieval system and then desires to speak to a live agent, the user must place a phone call to the service operator for that system.

Using state-of-the-art technology, it is possible for a user having a PC connected to the internet to connect with an audio chat server, see who else is connected to the server, select a connected user, and then become connected in a live audio chat with one or more people. This type of system, however, is certainly not conducive to establishing a communication link for the transfer of private information.

Accordingly, a need exists in the art for a system in which an internet user who is connected to a particular web page or to a particular server can establish an audio link to a customer representative appropriate to the ongoing transaction.

A need also exists in the art for a system in which an audio link can be established via the internet from a PC, or other internet terminal device, user to an agent for a particular service without the need for the user to select the particular agent.

SUMMARY OF THE INVENTION

The above and other needs are achieved in accordance with one embodiment of the invention in which there is created a selection option on the PC screen allowing the user to talk to a service agent. Assuming the user is using a computer system, or other internet terminal device, and an internet browser having audio capabilities, the user is then connected to a live agent for a two-way audio exchange. If the user does not have audio capacity, the user and the selected agent can carry on a "text" chat conversation. If the user has a TV camera, the user can actually see the agent, although the video image is not nearly as critical in the information exchange as being able to carry on a live voice or real-time text chat with the proper agent.

A technical advantage of the present invention is the synergism of using voice technology on a common access database (such as the internet), in combination with an automatic call distribution (ACD) system, such that the system knows which agent(s) is available at any one time and connects the user to the next available agent for bi-directional data exchange.

Another technical advantage of the present invention is that it creates a system and method which allows a user who is connected on a computer-to-computer network for the interchange of data to establish a real-time audio connection with an agent who is selected according to the particular application to which the user is connected.

Yet another technical advantage of the present invention is that an agent pool is created on the internet, wherein the particular agent that becomes associated with a user is selected as a result of the context in which the user is at that time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
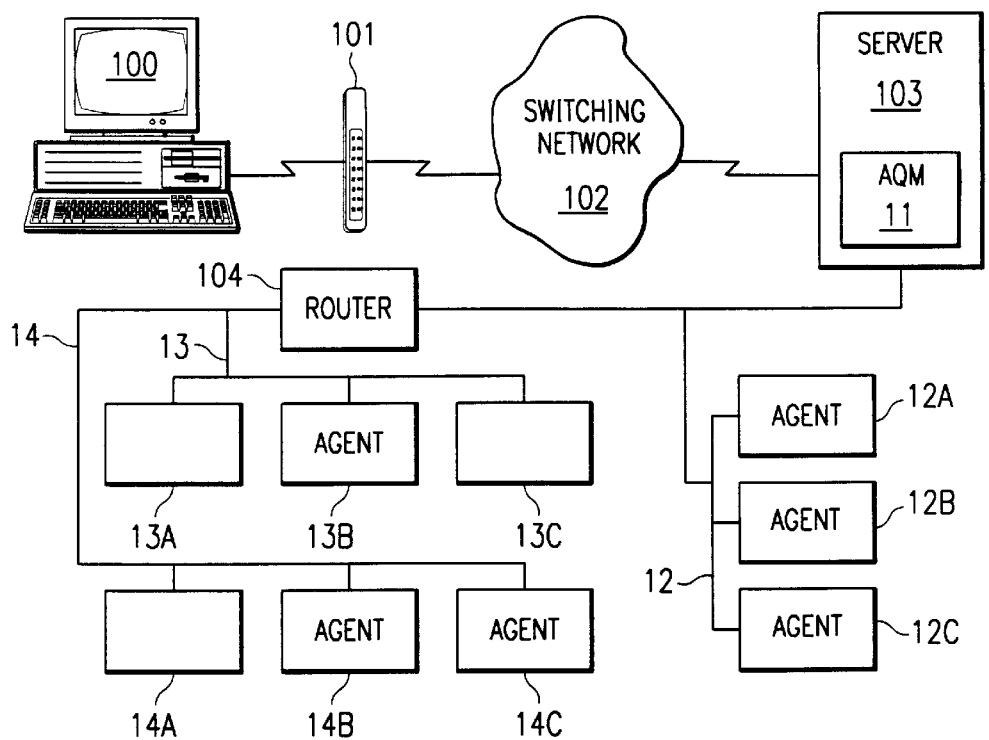
FIG. 1 shows a high level block diagram of a common access communications link.

FIG. 1 shows the overall operation of a traditional common access communication link, such as the internet, wherein certain computers, such as PC 100, can access a server, such as server 103, which may be located, for example, at a bank. This access can be via a traditional telephone switching network 102 or, as will be seen, can be via the internet. PC 100 uses a digital communications device such as modem 101 for effecting this access. PC 100 could also become connected to server 103 via the internet as is shown by branches 13 and 14 wherein several different PCs, such as PCs 13A–13C and 14A–14C are connected through an internet service provider and eventually routed via router 104 to server 103. These types of computers and connections are all well known in the art.

In addition, FIG. 1 shows local network 12 which has terminals 12A–12C which are used in this environment for a specific type of access to server 103 as will be discussed hereinafter.

Figure 2:
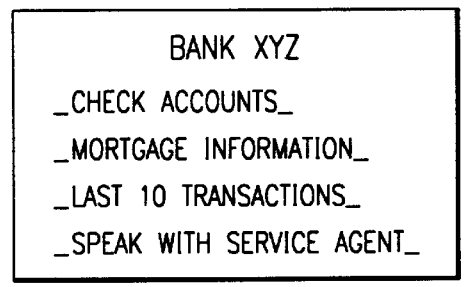
FIG. 2 shows a web page screen from a bank with a provision for selecting a service agent.

Assume that PC 100 is used by a customer of a bank and that the banking data resides on server 103. This server 103 has access to various types of information, such as the customer's checking account balance, last ten transactions, last month's statement, investment balances, etc. The customer can obtain access to any selected information via PC 100 through telephone network 102. A screen appears on PC 100 similar to that shown in FIG. 2 and the customer (user) chooses, by selecting the desired transaction and clicking the mouse (or any other selection method).

At some point during the examination of the selected information from server 103, the user at PC 100 may wish to discuss an account with a live customer service agent, either by voice or by real-time text communication. The user would then, via the screen shown in FIG. 2, select "service agent" and agent queuing manager 11, as will be discussed hereinafter, will connect the user at PC 100 to the next available live agent.

In our example, live customer service agents could be persons at any one of the PCs shown in FIG. 1, 12A–12C, 13A–13C, or 14A–14C. These agents would be operating, for example, from a PC similar to PC 100 and connected to server 103 via any one of a number of different connection modes. As shown in FIG. 1, work stations 12A–12C are connected to server 103 via local private network 12, which could be, for example, an ethernet LAN. LAN 12 can be extended by router 104 to serve branches 13 and 14, wherein the users of PCs 13B, 14B and 14C are assigned to bank XYZ as agents when they are connected to server 103.

Agent queuing manager (AQM) 11 controls which agent is connected to a particular user depending upon the context of the user at the time of the selection. The "context" is the information that the user is currently accessing. Accordingly, if the user is reviewing mortgage information, AQM 11 can use that context to choose a suitable agent.

Digressing momentarily, terminals 12A–12C, when logged on, are always agents. Other agents that are connected to the network, such as the users of terminals 13B, 14B, and 14C, can be connected via any internet service provider. In each case, the agent must log in to AQM 11. When an agent logs in to AQM 11, the agent is essentially indicating to AQM 11 that the agent is available to interact with users.

At this point, the agents are idle and waiting, so when the user of PC 100 clicks on the "Service Agent" link, AQM 11 is alerted that a user wishes to talk to a live agent. AQM 11 then reviews its list of logged on agents and picks an agent. Typically, AQM 11 will assign a next available agent to a connection. However, it may be also desired to select the agent based upon the context of the user, a history of requests, or upon other statistical, monitored, or preprogrammed data.

Next, AQM 11 establishes a connection between the agent and PC 100. This connection allows the agent and the user to either carry on a live voice conversation if both parties have audio support, or a real-time text chat if PC 100 lacks audio capability. If supported by the PCs and network, live video could be exchanged. In any event, AQM 11 selects an agent, connects the user with the agent, and monitors the connection. When the user is finished talking to the live agent, AQM 11 returns the agent to the available queue and disconnects the user from the agent.

AQM 11 removes agents from the list of available agents when they log off. Another function of AQM 11 is to handle users when all agents are busy. If AQM 11 examines the list of available agents and finds that there are no available agents, AQM 11 can announce to the user that there are no available agents and that it will either allow the user to wait until the next agent is available or schedule a callback, as shown in U.S. Pat. No. 5,155,761, entitled "AUTOMATIC CALLBACK SYSTEM AND METHOD OF OPERATION," which patent is hereby incorporated by reference herein.

Figure 3:
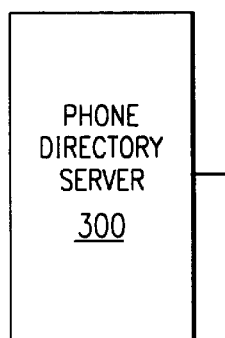
FIG. 3 shows a prior art internet phone directory server.
Figure 4:
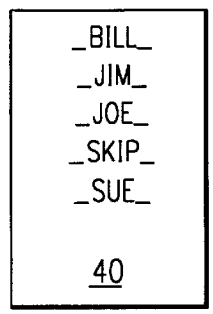
FIG. 4 shows a prior art selection screen whereby a user can select the person (or group of people) with which the user desires to chat.

FIG. 3 shows the existing system of using the internet to establish audio communications between two or more parties. The current method of operation that existing technology allows is called the "phone book method." In this method, PC users 31–33 who are willing to accept audio calls log in to a central location such as server 300 in system 30. In this case, there is no AQM and all of the users' names (identifiers) are listed, as shown in FIG. 4, screen 40. Everyone who is in phone directory 40 can be accessed by simply clicking on a link in a standard HTML page using a HTML browser in a well known manner. The browser, such as NETSCAPE NAVIGATOR™, which is hereby incorporated by reference herein, can access phone directory 40 from a given PC and, when the phone directory is accessed and shown on the user's PC, allow the user to select the person to which the user desires to talk. Actually, the phone list is not updated in real-time, so there may be people that are currently busy on another connection or who have simply gone away. In fact, one of the problems of the existing system is that it is not kept up-to-date. This problem does not exist with AQM 11 since it tracks agents on a constant, real-time basis.

Figure 5:
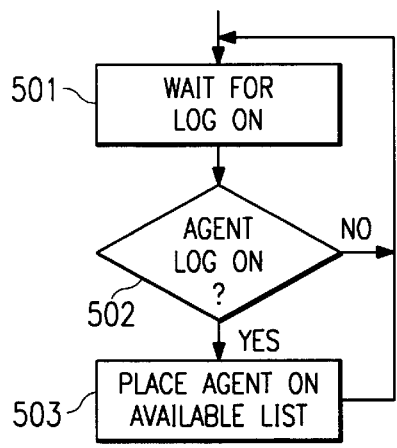
FIGS. 5 and 6 are flow charts showing the logic followed during a typical agent log on and log off, respectively.

FIG. 5 is a flow chart showing the log on control that is exercised by AQM 11 to effect calls on the internet and to provide the Automatic Call Distribution (ACD) function. Basically, AQM 11 waits for an agent to log on (block 501). This waiting is shown in test block 502, which is a test of whether an agent is trying to log on. If no agent is trying to log on, AQM 11 just loops and waits. When an agent tries to log on, the process drops to block 503 which verifies the agent by asking for passwords, etc. and then places the agent on the "available" list which is actually a list or queue maintained in storage (not shown) controlled by AQM 11. Additionally, AQM 11 may inquire as to particular contexts for which the agent logging on should be made available. Alternatively, AQM 11 may maintain a data base of contexts that (not shown) a particular agent is to be made available for when logged on.

Figure 6:
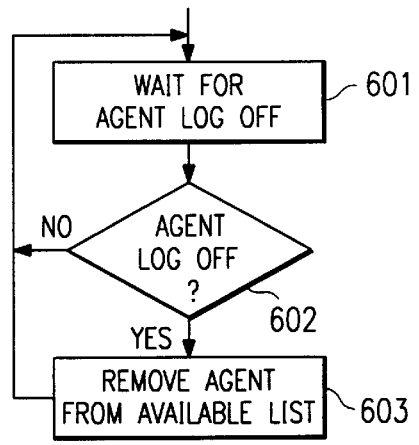

FIG. 6 is a flow chart showing the agent log off process. The agent log off process works similarly to the log on process, only in reverse. AQM 11 simply waits at blocks 601 and 602 for a log off request. When such a request occurs and the agent logs off, AQM 11 drops to block 603 where the agent is removed from the "available" list and the process returns back to the beginning at blocks 601 and 602, where AQM 11 again waits for an agent to log off. Note that the system can be designed to encourage agents to "log off" when not needed by using factors such as statistics, monitoring, or time of day.

Figure 7:
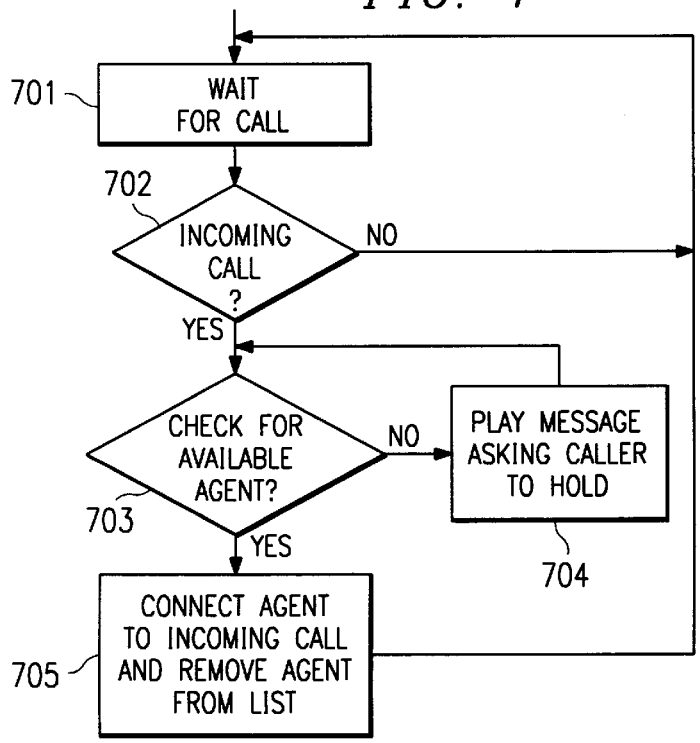
FIGS. 7 and 8 are flow charts showing the logic followed during a typical agent connection and disconnection, respectively.

FIG. 7 is a flow chart showing the connection logic used by AQM 11. In blocks 701 and 702, AQM 11 waits for an incoming call. When an incoming call arrives and the connection logic detects the call, AQM 11 takes the "yes" branch from block 702 and goes to block 703 where AQM 11 changes the availability list and selects an agent according to one of the previously mentioned selection criteria.

At block 705, AQM 11 makes the agent selection, removes the selected agent from the available list and connects the agent to calling PC 100. If no agent is available, AQM 11 follows the "No" branch out of block 703 and delivers a message telling the caller (user) to hold for an available agent (block 704). As discussed above, the user could be set up for a callback as soon as an agent becomes available. Otherwise, the caller is connected to the next available agent.

Figure 8:
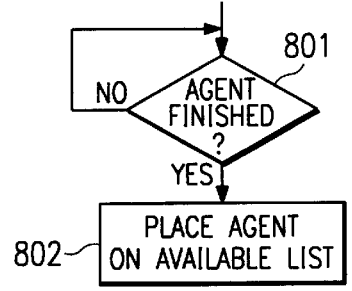

FIG. 8 is a flow chart illustrating the disconnect logic followed by AQM 11 when an agent finishes a call. As long as an agent is on a call and not finished, AQM 11 stays in block 801. When an agent is detected as being finished with the call, AQM 11 places the agent back on the available list, as discussed in FIG. 5, and the agent becomes available to handle another call (block 802).

It should be noted that the system, as envisioned, relies on data compression to transmit audio information over current networking hardware. There should be a delay time of less than 2 seconds turnaround between speakers to be tolerable. There are many well-known software programs available today for transmitting audio information via networks such as the internet. These programs run on industry standard computers such as those having INTEL™ X86 compatible processors and well known audio processing capabilities.

Although the present invention and its advantages have been described in detail, it should be understood that various changes, substitutions and alterations can be made herein without departing from the spirit and scope of the invention as defined by the appended claims.

What is claimed is:

1. A system for the real-time exchange of information between a computer user and an agent associated with a selected data source of a plurality of data sources over a common access data link, said system comprising:

means for maintaining an agent pool associated with the selected data source, wherein the agent pool comprises one or more agents;

means for logging agents into the agent pool;

means for logging agents out of the agent pool;

means under selective control of the computer user for exchanging data between the user and the selected one of the plurality of data sources;

means for communicating from the user to the selected data source that the user desires to establish a bi-directional data link from the user to the agent for the exchange of data between the user and the agent; and means responsive to receipt of a communicated desire for a bi-directional data link for establishing such a link from the user to an agent selected as a function of the particular data source currently selected by the user.

2. The system of claim 1, wherein the maintaining means updates the agent pool substantially concurrent with the agents logging into the agent pool and out of the agent pool.

3. The system of claim 1, further comprising:

means for maintaining a data base associating particular agents of said agent pool with a particular data source selectable by the user.

4. The system of claim 1, wherein the bi-direction data link exchanges data representing audio signals.

5. The system of claim 1, wherein the bi-directional data link exchanges data representing text.

6. The system of claim 1, further comprising:

a plurality of agents associated with the selected data source; and wherein the establishing means includes means for selecting an available one of the plurality of agents.

7. The system of claim 6, wherein the means for selecting comprises:

means for selecting an agent according to a predetermined method.

8. The system of claim 7, wherein the predetermined method selects the longest idle agent.

9. The system of claim 7, wherein the predetermined method selects the agent based upon the user's history of selections.

10. A method of communicating between a PC user and an available agent selected from among a plurality of different agent pools, each such agent pool associated with a particular data source, the method comprising the steps of:

establishing a data exchange relationship from the user to a selected data source over a data link, wherein said data link provides common access for said user, said selected data source, and said available agent;

receiving over said data link, from the selected data source, a menu of choices, one of the choices being a bi-directional data exchange;

selecting an available agent from said agent pool associated with the selected data source in response to the selection by the user of the menu choice indicating a bi-direction data exchange, said selection by the user being received by said selected data source over said data link;

wherein said step of selecting includes
determining if the agent from the agent pool associated with the selected data source is available, and
selecting the agent from the agent pool associated with the selected data source if the agent is determined to be available;

wherein if it is determined that no agent is immediately available, presenting alternative choices to the user regarding said selection of the menu choice indicating bi-direction data exchange.

11. The method of claim 10, further comprising the step of:

sending data between the selected agent and the user.

12. The method of claim 11, wherein said sending data between the selected agent and user is substantially real time.

13. The method of claim 11, wherein the data is sent in at least one direction over the common access data link.

14. The method of claim 11, wherein the data is audio data.

15. The method of claim 14, wherein the audio data is compressed.

16. The method of claim 11, wherein the data is text.

17. The method of claim 11, wherein the data is selected from the group consisting of:

text, audio, video, and graphics.

18. The method of claim 10, wherein the agents are connected to the common access data link via a private network serving only the agents.

19. The method of claim 10, wherein the selecting step comprises the steps of:

measuring usage from different users to the agent pool; and adjusting the number of agents in the agent pool in accordance with the measured usage.

20. The method of claim 19, further comprising the step of:

adding agents from remote locations over the common access data link to the agent pool.

21. The method of claim 10, wherein said step of presenting alternative choices to the user regarding said selection of the menu choice indicating bi-direction data exchange further comprises:

one of the alternative choices being requesting an agent call back.

22. The method of claim 10, wherein said step of presenting alternative choices to the user regarding said selection of the menu choice indicating bi-direction data exchange further comprises:

one of the alternative choices being waiting on the next available agent.

23. A system for establishing real-time communication between a computer user and an agent via the Internet, comprising:

means for presenting the user with an option to communicate with an unspecified agent via a computer;

means, responsive to the selection of the option, for selecting the unspecified agent from an agent pool comprising a plurality of agents;

wherein the means for selecting comprises
means for maintaining the agent pool,
means for determining available agents in the agent pool, and
means for choosing the agent from the available agents;

means for establishing a real-time data communications link via the Internet between the selected agent and the computer user, wherein said real-time data communications link provides common access for said user, a selected data source, and said selected agent.

24. The system of claim 23, wherein the means for presenting comprises:

means for transmitting information to the user including the option to communicate with the unspecified agent;

means for receiving information from the user, wherein the information indicates whether the option to communicate with the unspecified agent has been selected.

25. The system of claim 24, wherein the means for presenting comprises a web server and the transmitted information comprises a HTML document.

26. The system of claim 23, wherein the means for maintaining the agent pool comprises:

means for allowing the agent to log on;

means for verifying the agent during log on;

means for adding the verified agent to the agent pool;

means for allowing the agent to log off;

means for removing the logged off agent from the agent pool.

27. The system of claim 26, wherein the maintaining means further comprise means for indicating a context to which the agent is to be associated.

28. The system of claim 26, wherein the adding means operates substantially concurrent with the agent logging on.

29. The system of claim 26, wherein the removing means operates substantially concurrent with the agent logging off.

30. The system of claim 23, wherein the means for determining available agents comprises:

means for determining a context of the user;

wherein the determination of available agents depends upon the context.

31. The system of claim 23, wherein the means for determining available agents comprises:

means for determining whether any agents in the pool are free;

means for handling the user if no agents in the pool are free.

32. The system of claim 31, wherein the means for handling comprises:

means for holding the user until an agent becomes free.

33. The system of claim 31, wherein the means for handling comprises:

means for contacting the user when an agent becomes free.

34. The system of claim 23, wherein the means for choosing the agent comprises:

means for determining the longest idle agent; and means for choosing the longest idle agent.

35. The system of claim 23, wherein the means for choosing the agent comprises:

means for storing the user's history of agent requests; and means for choosing the agent based upon the user's history of agent requests.

36. The system of claim 23, wherein the means for establishing comprises:

means for establishing a digital audio communications link.

37. The system of claim 23, wherein the means for establishing comprises:

means for establishing a text communications link.

38. The system of claim 23, wherein the means for establishing comprises:

means for establishing a video communications link.

39. A system for real-time exchange of audio communications between a computer user and an unspecified agent of a plurality of agents associated with a selected data source of a plurality of data sources assessable over a computer network, said system comprising:

means for logging an agent of plurality of agents onto and off of the system;

means for associating an agent logged onto the system with a data source of the plurality of data sources accessible over the computer network;

means for maintaining an agent pool of agents currently logged onto the system and associated with selected data sources of the plurality of data sources;

means for adding agents to the agent pool substantially concurrent with the agents logging onto the system;

means for removing agents from the agent pool substantially concurrent with the agents logging off of the system;

means for determining agents of the agent pool available for audio communication with the computer user;

means under selective control of the computer user for exchanging data between the user and the selected data source of the plurality of data sources;

means for communicating from the user to the selected data source that the user desires to establish a bi-directional audio communication link between the user and the unspecified agent; and means responsive to receipt of the communicated desire for a bi-directional audio communication link for establishing such a link between the user and an available agent of the agent pool associated with the particular data source currently selected by the user.

* * * * *